(12) United States Patent　　(10) Patent No.: US 11,414,723 B2
Goenka et al.　　(45) Date of Patent: Aug. 16, 2022

(54) SYSTEMS AND METHODS FOR PRODUCING HOT INDUCTION PIPE BENDS WITH HOMOGENEOUS METALLURGICAL AND MECHANICAL PROPERTIES

(71) Applicant: Welspun Corp Limited, Mumbai (IN)

(72) Inventors: Balkrishan Goenka, Mumbai (IN); Prasanta Mukherjee, Mumbai (IN); Shashidhar Dwivedi, Mumbai (IN); Hardik Shah, Mumbai (IN); Suresh Dungrani, Mumbai (IN)

(73) Assignee: Welspun Corp Limited, Mumbai (IN)

( * ) Notice: Subject to any disclaimer, the term of this patent is extended or adjusted under 35 U.S.C. 154(b) by 398 days.

(21) Appl. No.: 16/413,531

(22) Filed: May 15, 2019

(65) Prior Publication Data

US 2019/0352737 A1　　Nov. 21, 2019

Related U.S. Application Data

(60) Provisional application No. 62/674,290, filed on May 21, 2018.

(51) Int. Cl.
*C21D 11/00*　　(2006.01)
*C21D 9/08*　　(2006.01)
(Continued)

(52) U.S. Cl.
CPC .............. *C21D 11/005* (2013.01); *B21D 7/00* (2013.01); *B21D 7/025* (2013.01); *B21D 7/162* (2013.01);
(Continued)

(58) Field of Classification Search
CPC .......... B21D 7/00; B21D 7/025; B21D 7/162; B21D 7/165; B21D 7/04; C21D 11/005; C21D 1/18; C21D 1/42; C21D 9/085
(Continued)

(56) References Cited

U.S. PATENT DOCUMENTS 4,254,649 A * 3/1981 Cervenka ............... B21D 7/025
　　　　　　　　　　　　　　　　　72/128
4,412,442 A * 11/1983 Kawanami ............. B21D 7/162
　　　　　　　　　　　　　　　　　72/128

(Continued)

FOREIGN PATENT DOCUMENTS

JP　　S59218222　　* 12/1984 ............... B21D 7/00

*Primary Examiner* — Jessee R Roe
*Assistant Examiner* — Michael Aboagye
(74) *Attorney, Agent, or Firm* — Finnegan, Henderson, Farabow, Garrett & Dunner, LLP

(57) ABSTRACT

In one embodiment, a method for manufacturing a pipe bend is disclosed, comprising: heating, with an induction coil, a first annular band of a wall of a first end portion of a moving pipe; directing quenching fluid toward an outer and inner surface of the first annular band; heating a second annular band of a wall of a bend portion of the moving pipe; directing the quenching fluid toward an outer and inner surface of the second annular band; decreasing a speed of the pipe while moving the induction coil from stationary and maintaining a relative speed between the pipe and the induction coil substantially constant; heating a third annular band of a wall of a second end portion of the pipe while moving the induction coil; and directing the quenching fluid toward an outer surface and an inner surface of the third annular band while moving the induction coil.

18 Claims, 8 Drawing Sheets

(51) Int. Cl.
*C21D 1/18* (2006.01)
*C21D 1/42* (2006.01)
*B21D 7/16* (2006.01)
*B21D 7/025* (2006.01)
*B21D 7/00* (2006.01)
*B21D 7/12* (2006.01)

(52) U.S. Cl.
CPC ............ *B21D 7/165* (2013.01); *C21D 1/18* (2013.01); *C21D 1/42* (2013.01); *C21D 9/085* (2013.01); *B21D 7/12* (2013.01); *B21D 7/16* (2013.01); *C21D 2221/00* (2013.01)

(58) Field of Classification Search
USPC ...... 72/128, 342.5, 342.6, 369, 12; 219/153, 219/602, 635, 659
See application file for complete search history.

(56) References Cited

U.S. PATENT DOCUMENTS

| | | | | |
|---|---|---|---|---|
| 4,596,128 A * | 6/1986 | Ringersma | ............ | B21D 7/025 |
| | | | | 72/128 |
| 5,491,996 A * | 2/1996 | Baarman | ................ | B21D 7/025 |
| | | | | 72/128 |
| 8,863,565 B2 * | 10/2014 | Tomizawa | ............. | B21D 7/165 |
| | | | | 72/342.6 |
| 10,335,843 B2 * | 7/2019 | Tomizawa | ............... | B21D 7/08 |
| 10,478,880 B2 * | 11/2019 | Schaefer | ................. | B21D 7/04 |

* cited by examiner

SYSTEMS AND METHODS FOR PRODUCING HOT INDUCTION PIPE BENDS WITH HOMOGENEOUS METALLURGICAL AND MECHANICAL PROPERTIES

CROSS-REFERENCE TO RELATED APPLICATION

This application is based on and claims benefit of priority of U.S. Provisional Patent Application No. 62/674,290, filed May 21, 2018, which is incorporated herein by reference.

TECHNICAL FIELD

The disclosed embodiments generally relate to systems and methods for manufacturing pipe bends and, more particularly, to systems and methods for increasing the homogeneity of metallurgical and mechanical properties of steel bends produced by a hot induction method.

BACKGROUND

Large diameter pipes are used in a variety of applications, such as oil and gas pipelines. Such pipelines generally require manufacture of pipe bends to comply with a desired route, which may be impacted by design, environmental, geographical, safety, or other pertinent regulations or concerns. Pipe bends may be formed using specialized manufacturing processes, such as induction bending, to achieve the desired material properties. However, current induction bending methods may include one or more drawbacks. For example, typical induction bending methods may heat the pipe over only the pipe segment being bent. This results in material transition zones between the straight and bent portions of the pipe, creating an inhomogeneous distribution of grains within the pipe bend wall. Inhomogeneous grain distribution may lead to inhomogeneous mechanical properties, thus decreasing reliability and introducing potential points of failure in the pipe bend, which may increase the need for post-bend heat treatment. Presently disclosed embodiments address one or more of these drawbacks in current induction bending methods, for example, by reducing or eliminating the need for certain post-bend heat treatments.

SUMMARY

Disclosed embodiments include a system for manufacturing a pipe bend, including: a securement structure including a securement device configured to secure a first end of a pipe and a pivot arm coupled to the securement device and configured to pivot about a pivot point to introduce a bend in the pipe; an induction ring configured to heat an annular band of a wall of the pipe; a first quenching ring configured to direct a first quenching fluid toward an outer surface of the heated annular band in the wall of the pipe; a second quenching ring configured to direct a second quenching fluid toward an inner surface of the heated annular band in the wall of the pipe; and a processor configured to control a heating system, a temperature measurement and control system, securement devices, a pipe positioning system, movement of an induction heating coil, release of the first quenching fluid and the second quenching fluid such that the first quenching fluid reaches the outer surface and the second quenching fluid reaches the inner surface substantially concurrently.

Disclosed embodiments also include a method for manufacturing a pipe bend, including: heating, with an induction coil, a first annular band of a wall of a first end portion of a pipe while moving the pipe in a first direction at a first speed to establish a relative speed between the pipe and the induction coil; directing quenching fluid toward an outer surface and an inner surface of the first annular band in the wall while moving the pipe in the first direction; securing a first end of the pipe in a securement device coupled to a pivot arm; heating a second annular band of a wall of a bend portion of the pipe while moving the pipe in the first direction; directing the quenching fluid toward an outer surface and an inner surface of the second annular band in the wall while moving the pipe in the first direction; decreasing the first speed of the pipe to stationary while moving the induction coil from stationary to a second speed in a second direction opposite the first direction, where a rate of decrease of the first speed and a rate of increase of the second speed are controlled to maintain the relative speed between the pipe and the induction coil substantially constant; heating a third annular band of a wall of a second end portion of the pipe while moving the induction coil in the second direction; and directing the quenching fluid toward an outer surface and an inner surface of the third annular band in the wall while moving the induction coil in the second direction.

Disclosed embodiments also include a pipe including an annular wall and having: a first end; a second end; a bend portion disposed between the first end and the second end; a first end portion disposed between the first end and the bend portion; and a second end portion disposed between the second end and the bend portion; and wherein an average grain size, for example, as determined by ASTM International Standard No. E112-13, in the bend portion is within 1 average grain size of an average grain size, as determined by ASTM International Standard No. E112-13, of the first end portion or the second end portion.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Reference will now be made in detail to the disclosed embodiments, examples of which are illustrated in the accompanying drawings. Wherever convenient, the same reference numbers will be used throughout the drawings to refer to the same or like parts.

As discussed in further detail below, provided herein are various embodiments of a pipe bend, and methods and systems for making the pipe bend. Presently disclosed embodiments may include a pipe bend having greater homogeneity in one or more properties of the pipe bend throughout the pipe bend structure, as compared to traditional pipe bends. For example, certain embodiments may enable greater homogeneity in metallurgical structure and/or mechanical properties along the length of the pipe bend and/or across the thickness of the wall of the pipe bend, as compared to traditional systems. For example, in some embodiments, one or more mechanical properties of the pipe bend, such as grain size, strength, tensile strength, ductility, hardness, etc., may have greater homogeneity than existing pipe bends, as discussed in more detail below.

Presently disclosed embodiments also include a method for manufacturing the pipe bend with the improved metallurgical and/or mechanical properties described above. In certain embodiments, the disclosed method may produce improved pipe bends by heat treating the entire length of a pipe, including the end portions of the pipe bend that remain straight after the bending operation has commenced. For example, in some embodiments, the end portions of the straight pipe from which the pipe bend is formed may be subjected to the same induction heating and quenching as the bent portion of the pipe bend. The foregoing feature may enable the reduction or elimination of the presence of one or more transition zones in the produced pipe bend located between the bent portion of the pipe bend and the ends of the pipe bend.

Further, some disclosed embodiments may include systems and methods that enable greater homogeneity in pipe bend properties by quenching the internal and external surfaces of the wall of the pipe at substantially the same time with a quenching fluid. The foregoing feature may enable greater uniformity across the thickness of the pipe wall because the temperature treatment of the wall is approximately the same on each side of the pipe wall and throughout the length. Still further, in some embodiments, the speed at which the pipe moves relative to the induction coil may be maintained at a substantially constant level through treatment of the length of the pipe, thus further increasing the likelihood that the entire pipe is treated similarly along its length. These and other features of presently disclosed embodiments are described in more detail below.

Figure 1:
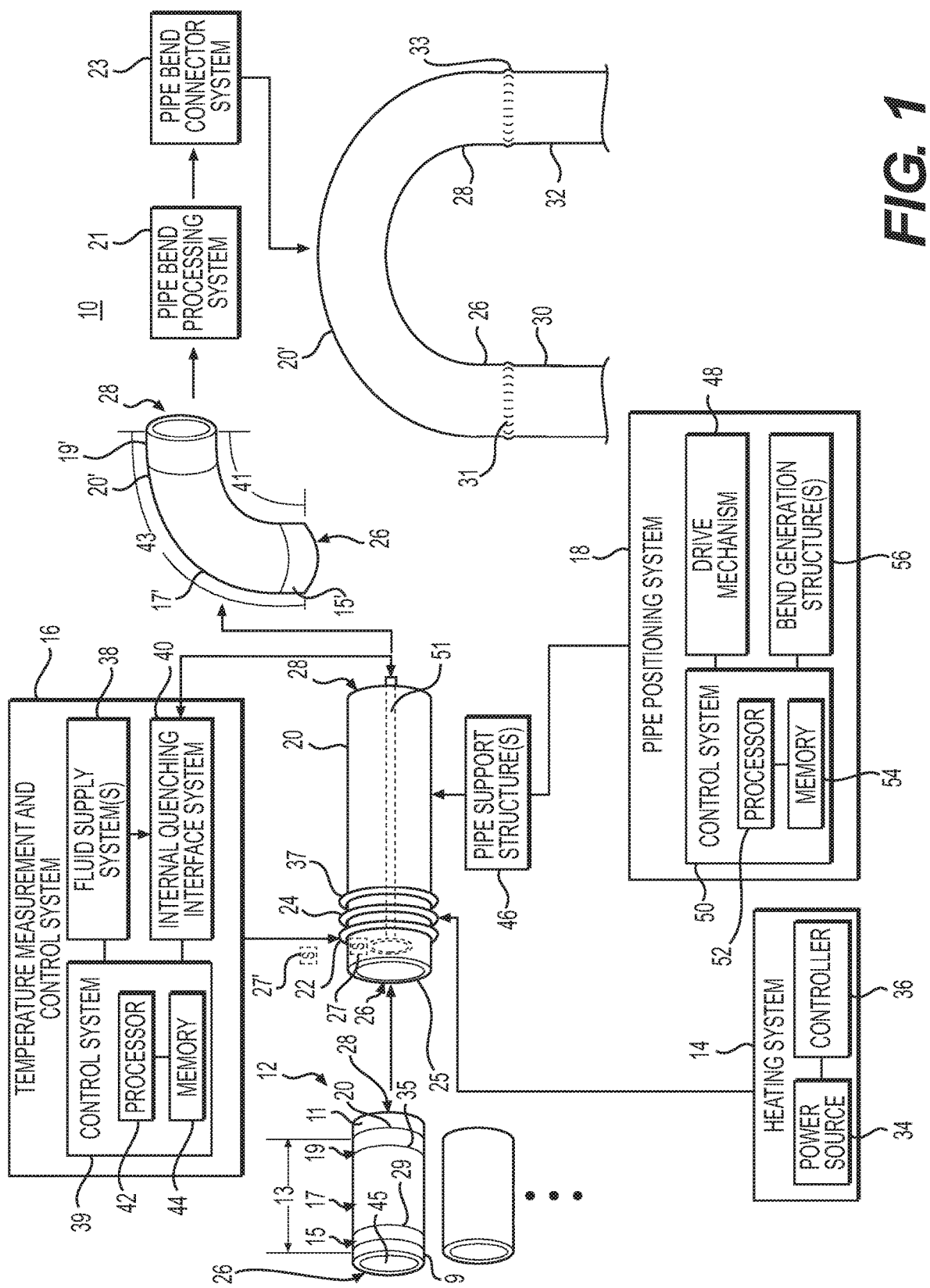
FIG. 1 illustrates a pipe bending system, consistent with disclosed embodiments.

Turning now to the drawings, FIG. 1 illustrates a pipe bending system 10 in accordance with one embodiment of the present disclosure. In the illustrated embodiment, the pipe bending system 10 includes a stock of a plurality of pipes 12, a heating system 14, a temperature control system 16, a pipe positioning system 18, and a pipe bend processing system 21. During operation, a pipe 20 from the plurality of pipes 12 may be positioned by the pipe positioning system 18 for bending, controlled by the heating system 14 and temperature control system 16. The output of the pipe bending system 10 is a pipe bend 20'.

In some embodiments, the pipe bend 20' may be subjected to one or more post-bend processing operations (e.g., measurement and/or inspection testing, hydro testing, end beveling, etc.) in the pipe bend processing system 21, depending on implementation-specific considerations. For example, the pipe bend 20' may be used in a variety of downstream applications, such as an oil and gas pipeline, power or nuclear power plants, or any other industry using pipe bends for pipeline purposes, each of which may have application-specific post-processing steps. As shown, once processed for the given application, the pipe bend 20' may be processed by a suitable pipe bend connector system 23 to incorporate the pipe bend 20' into a larger pipe system. For example, in the illustrated embodiment, the pipe bend 20' is shown connected to a pipe 30 at the first end 26 and a pipe 32 at the second end 28 via welds 31 and 33, respectively. However, it should be noted that the illustrated embodiment is merely an example. In other embodiments, the pipe bend 20' may be connected to other pipes 30, 32 in any suitable manner, or incorporated into any pipe system (e.g., multiple pipe bends 20' may be needed for some implementations).

More specifically, FIG. 1 illustrates the generation of an induction bend from the substantially straight pipe 20 having a length 13. As illustrated, the pipe 20 may include a first end portion 15 extending from a first end 26 to a transition point 29, a bend portion 17 extending from transition point 29 to transition point 35, and a second end portion 19 extending from transition point 35 to second end 28. The first and second end portions 15, 19 may lie tangent to the bend portion 17. In presently disclosed embodiments, each of the three pipe portions 15, 17, and 19 are heat treated in a similar manner such that the likelihood of transition zones in the pipe bend 20' having different mechanical and/or metallurgical properties is reduced or eliminated. In some embodiments, the first end portion 15 and/or the second end portion 19 may be adjacent one or more pipe extensions 9 and 11. The length of the pipe extensions 9 and 11 may be provided to enable the pipe to be secured during processing while the portions 15, 17, and 19 are treated similarly. For example, the pipe extensions 9 and 11 may function as dummy length(s) of pipe that may be held by securement devices during processing. However, the pipe extensions 9 and 11 may be removed post treatment of the pipe 20, such that pipe bend 20' includes portions 15', 17', and 19' without extensions 9 and 11. That is, the dummy length(s) provided by extensions 9 and 11 may be trimmed and removed before the pipe bend 20' is connected to another pipe segment.

In the embodiment shown in FIG. 1, the pipe 20 may be substantially straight at the beginning of the operation and be bent as the pipe 20 passes through an induction coil 22 and a quenching ring 24 for the entire length 13 of the pipe 20 from the first end 26 to the second end 28. A second quenching ring 25 disposed in a central cavity 45 of the pipe 20 may also be configured to operate on the length 13 of the pipe 20 in coordination with the induction coil 22 and the quenching ring 24. Further, an air supply ring 37 may be disposed about the pipe 20. In some embodiments, the pipe 20 may be a hollow pipe that includes the central bore 45. As shown, the pipe 20 may be substantially straight at the beginning of the operation, and the pipe bend 20' may be bent when the operation commences. As used herein, "substantially straight" may refer to the wall of the pipe 20 being substantially along a line (i.e., the total deviation from a straight line over the pipe length may be ≤0.2% of the pipe length, as described in API Specification 5L, 45$^{th}$ Edition, Effective Jul. 1, 2013, p. 42). That is, the pipe 20 may have imperfections, such as minor bends (e.g., 1 degree), indentations, etc. and still be "substantially straight."

In some embodiments, the bend portion 17' of the pipe bend 20' may be homogeneous when compared to one or both of end portions 15' and 19' of the pipe bend 20'. For example, in one embodiment, the average grain size, as determined by ASTM International Standard No. E112-13 ("ASTM E112"), in the bend portion 17' of the pipe bend 20' may be within 1 average grain size of the average grain size, as determined by ASTM E112, of at least one of end portion 15' and end portion 19' of the pipe bend 20'. For example, in one embodiment, the average grain size of bend portion 17' may be 11, and the average grain size of at least one of end portions 15' and 19' may be ±1.

For further example, in some embodiments, the average grain size determined by ASTM E112 of each of portions 15', 17', and 19' may be within ±1 of the average grain size determined by ASTM E112 of each of the other portions (i.e., each portion 15', 17', 19' compared to each other portion 15', 17', 19' is within ±1 grain size). For example, in another embodiment, the average grain size of bend portion 17' may be 8, the average grain size of end portion 15' may be 8.5, and the average grain size of end portion 19' may be 9.

Further, one or more mechanical properties of the pipe bend 20', such as strength, tensile strength, ductility, and hardness may be substantially similar at each given point along the length of the pipe bend, as compared to each other point at a different location along the length of the pipe bend. For example, the difference in yield strength at one location along the length of pipe bend 20' may differ by no more than 2.5% from the yield strength at another location; the difference in tensile strength at one location along the length of pipe bend 20' may differ by no more than 1% from the tensile strength at another location; the difference in the ductility at one location along the length of pipe bend 20' may differ by no more than 4% from the ductility at another location; and the difference in hardness at one location along the length of pipe bend 20' may differ by no more than 3% from the hardness at another location.

In some embodiments, since the entire length 13 of the pipe 20 is processed by the pipe bending system 10, the circumferential (e.g., arc) lengths 41 and 43 of the inner and outer walls (e.g., radius) of the pipe bend 20', respectively, may have one or more homogeneous properties. Further, since the entire length 13 of the pipe 20 is heat treated and cooled in a controlled manner (e.g., heating and cooling methods, temperatures, etc.), the metallurgical structure and mechanical properties may be substantially homogeneous along the circumferential or arc lengths 41, 43 of the produced pipe bend 20'. For example, in some embodiments, the pipe wall of the pipe bend 20' may have a different thickness through the intrados (along circumferential or arc length 41) than the extrados (along circumferential or arc length 43). These circumferential or arc portions of the wall may be treated at different temperatures to ensure homogenous grain distribution around the entire circumference of the pipe.

Turning now to the heating system 14, the system 14 may include one or more components for heating the pipe 20. For example, in the illustrated embodiment, the heating system 14 includes an induction coil 22, a power source 34, and a controller 36 configured to control the flow of power from the power source 34 to the induction coil 22. The power source 34 may be any suitable source of power. For example, in one embodiment, the power source 34 may be an alternating current (AC) power source configured to pass alternating current through the induction coil 22 to induce a potential, causing the temperature of an annular band in the pipe 20 to rise via an eddy current. The controller 36 may include one or more processors or memory components for controlling operation of the power source 34 and induction coil 22.

In the illustrated embodiment, the induction coil 22 may be annularly disposed about the outer circumference of the pipe 20. However, in other embodiments, the induction coil 22 may take on any suitable size or shape. During operation of the illustrated embodiment, the induction coil 22 is configured to heat an annular band of a wall of the pipe 20. When heated, the annular band may become malleable. The illustrated controller 36 may control the temperature of and/or power to the induction coil 22 such that the temperature of the pipe 20 reaches a pre-configured temperature. To that end, the controller 36 may receive feedback from one or more sensors 27 disposed within the central cavity 45 of the pipe 20 during the bending operation. For example, the controller 36 may be communicatively coupled with the control system 39 in the temperature control system 16 to receive this feedback during the bending operation.

Turning now to the temperature control system 16, the system 16 may include one or more components for cooling the pipe 20 after it passes through induction coil 22. For example, the temperature control system 16 may include a suitable arrangement of one or more quenching devices, such as quenching rings, and/or one or more air supply rings. In the illustrated embodiment, the temperature measurement and control system 16 includes a quenching ring 24 and a quenching ring 25, and an air supply ring 37. The quenching ring 24 may be annularly disposed about the outer wall of the pipe 20 such that the quenching ring 24 is external to the pipe 20. Air supply ring 37 may be annularly disposed about the outer wall of the pipe 20. For example, air supply ring 37 may be disposed adjacent quenching ring 24, as illustrated. In another embodiment, air supply ring 37 may be annularly disposed between the quenching ring 24 and the induction coil 22. The quenching ring 25 may be disposed within the central bore 45 such that the quenching ring 25 is internal to the pipe 20. In the illustrated embodiment, the quenching ring 25 is inserted and removed from the central cavity 45 of the pipe 20 via an extender 51. The extender 51 may house one or more conduits for supplying fluid(s), power, etc. to a location within the central cavity 45. For example, the extender 51 may include a conduit for supplying quenching fluid from the fluid supply system 38 through the internal quenching interface system 40 to the quenching ring 25. The extender 51 may also include one or more temperature sensors.

Each of quenching rings 24 and 25 may contain one or more jets or spigots for spraying the outer or inner pipe surfaces, respectively, with quenching fluid supplied by the fluid supply system(s) 38. The quenching fluid may be any suitable fluid capable of cooling the heated annular band generated in the pipe wall via induction coil 22. For example, the quenching fluid may be water, air, or any other suitable coolant supplied by the fluid supply system(s) 38. In some embodiments, the fluid supply system 38 may include a single supply of quenching fluid maintained at a given temperature and supplied to both quenching ring 24 and quenching ring 25. However, in other embodiments, a separate fluid supply system 38 may be provided for each of the quenching rings 24 and 25. The quenching rings 24 and 25 may dispense fluid at a 90° angle from the central axis of the pipe. In some embodiments, the quenching rings 24 and 25 may dispense fluid at different angles. The dispensing angle of both quenching rings 24 and 25 may be independently controlled.

In some embodiments, air may be supplied to the pipe 20 at an angle such that the air reduces or eliminates the likelihood that the quenching fluid will go to the induction heating zone, which may affect the heating process. For example, air supply ring 37 may supply air or another gas to the pipe at an angle to prevent the cooling fluid ejected by the quenching ring 24 from getting into the heating zone. Air supply ring 37 may supply pressurized air toward the pipe surface, for example, at a 45 degree angle.

In some embodiments, an internal quenching interface system 40 may be provided to route control signals, quenching fluid, power, etc. to the internal quenching ring 25 and/or the one or more sensors 27, 27' and/or receive signals, excess quenching fluid, etc. back from the internally disposed components. To that end, internal quenching interface system 40 may include one or more processors, memory, power supplies, etc.

The illustrated control system 39 includes one or more processors 42 and memory 44. The one or more processors 42 (e.g., microprocessor(s), application-specific integrated circuit (ASIC), field-programmable gate array (FPGA), etc.) may be configured to execute a control algorithm. By way of example, the control algorithm may be provided as machine-readable encoded instructions stored on a machine-readable medium, such as the memory 44, and may provide control signals for controlling operation of the quenching rings 24 and 25, one or more sensors 27, fluid supply system 38, etc. The control signals may control the inner and/or outer surface temperatures of the pipe 20 by engaging quenching rings 24 and 25 such that the temperature of the pipe 20 reaches a pre-configured temperature.

The memory 44 may be a tangible, non-transitory, machine readable medium. For example, the memory 44 may be volatile or non-volatile memory, such as read only memory (ROM), random access memory (RAM), magnetic storage memory, optical storage memory, or a combination thereof. Furthermore, a variety of control parameters may be stored in the memory 44 along with code configured to provide a specific output (e.g., control the temperature of the quenching fluid, etc.) during operation. In some embodiments, the processor(s) 42 may also receive an input from a user interface through which the user may choose a process and/or input desired parameters (e.g., desired temperature, and so forth).

The pipe positioning system 18 includes one or more components configured to position the pipe 20 with respect to the induction coil 22 and quenching rings 24 and 25 to enable bending of the pipe 20. Specifically, in the illustrated embodiment, the pipe positioning system 18 includes one or more pipe support structure(s) 46 configured to support and drive the pipe 20 through the induction coil 22. The pipe support structure(s) 46 may include any suitable clamps (e.g., a first clamp to clamp first end 26 of the pipe 20, second clamp to clamp second end 28 of the pipe 20), tables, conveyor belts, frames, and so forth, known to those of ordinary skill in the art.

A drive mechanism 48 is configured to drive movement of any desired components of the pipe bending system 10. For example, the drive mechanism 48 may drive movement of the support(s) 46, the pipe 20, the induction coil 22, the quenching ring 24, the quenching ring 25, or any combination thereof to enable a desired positioning of the pipe 20 relative to other system components. To that end, the drive mechanism 48 may include motors, engines, circuitry, etc. to drive movement of the support 46, the pipe 20, the induction coil 22, the quenching ring 24, the quenching ring 25, or any other desired system components. The drive mechanism 48 may be controlled by a control system 50 including one or more processors 52 and memory 54.

A bend generation structure 56 is configured to control the bend radius of pipe 20. In one embodiment, the bend generation structure 56 may include a radius arm fixed to a pivot or other structure to cause a bend to form in the pipe 20. In another embodiment, the bend generation structure may include one or more rollers configured to guide bending of the pipe 20 to the desired bend radius. The bend generation structure 56 may be controlled by control system 50. The one or more processors 52 and memory 54 may include components similar to those described above for the one or more processors 42 and memory 44 in the temperature control system 16. However, the control system 50 may utilize such components to control the position of the pipe 20 relative to the induction coil 22 and quenching rings 24, 25. To that end, the control systems 36, 39, and 50 may communicate via any known means (e.g., wirelessly, via wired connections, etc.) to coordinate control of the induction coil 22, the quenching rings 24, 25, and the pipe 20, or the relative movement between such components.

Once the pipe 20 is bent to a desired bend radius by the pipe bending system 10, a pipe bend 20' may be ready for any desired downstream processing by pipe bending system 21 or use. For example, in some embodiments, it may be desirable for a pipe bend 20' to undergo further heat treatment in a furnace to modify or enhance the mechanical properties of the pipe bend 20' or to customize the pipe bend 20' for a particular downstream implementation (e.g., an oil and gas pipeline implementation may require different properties than a nuclear plant implementation). However, in other embodiments, presently disclosed methods may produce a pipe bend 20' that does not require post-bend heat treatment to adjust, for example, inhomogeneous grain distribution. Further, the pipe bend 20' may be processed by the pipe bend connector system 23 to join the pipe bend 20' with pipe 30 at the first end 26 and pipe 32 at the second end 28. In some embodiments, the dummy portions of first end 26 and second end 28 may be removed prior to joining pipe 20' to other pipe segments. In some embodiments, such as implementations using large diameter pipes, the pipe bend 20' may be joined with the main pipeline at the laying site. In the illustrated embodiment, the pipe bend 20' may be welded to the pipes 30, 32 at welds 31 and 33. However, in other embodiments, the pipe bend 20' or may be affixed to one or more pipes 30, 32 using other joining means or couplers, depending on implementation-specific considerations.

Figure 2:
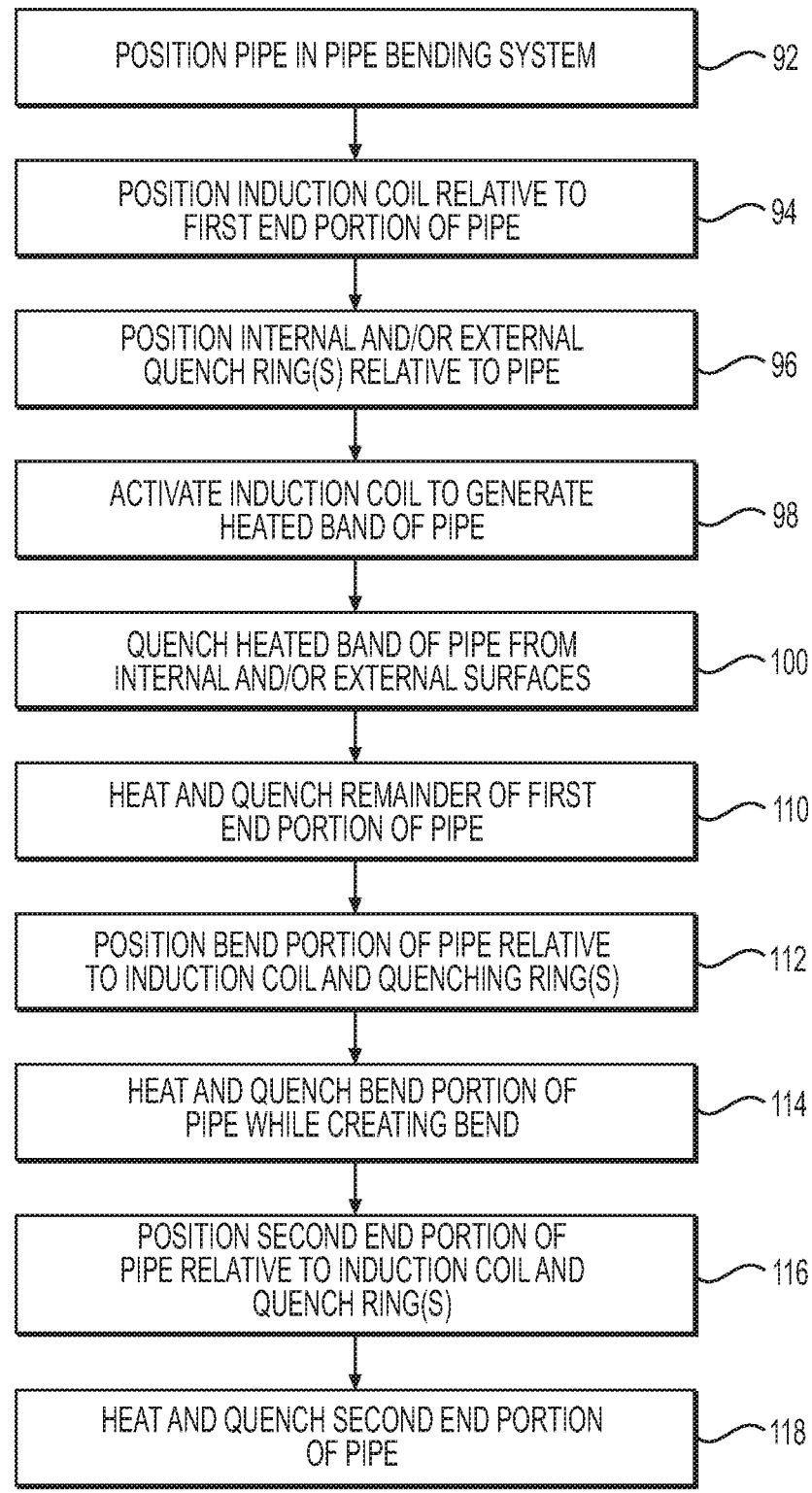
FIG. 2 is a flow chart of an exemplary pipe bending process, consistent with disclosed embodiments.

FIG. 2 illustrates an exemplary process 90 for bending a pipe using the pipe bending system 10. The process 90 may include treating the first and second end portions 15, 19 and the bend portion 17 of the pipe 20 to achieve one or more homogeneous properties in the produced pipe bend 20'. In some embodiments, the pipe bending process may be continuous such that the process 90 is not started and stopped with each of the illustrated method blocks. Indeed, the method blocks are shown separately merely for illustrative purposes.

In the illustrated embodiment of method 90, the pipe 20 may be positioned in the pipe bending system 10 (block 92). For example, the pipe 20 may be positioned via an overhead material handling crane from the pipe stock 12 to the location of the pipe bending system 10. Once located in the pipe bending system 10, one or more securement devices (e.g., clamps) may be used to secure the pipe 20 in a desired location. In some embodiments, the secured portion of the pipe 20 may be a dummy length (e.g., one of extensions 9 and 11) that will be trimmed and removed from the pipe after processing.

Once the pipe 20 is secured in the pipe bending system 10, the induction coil 22 may positioned relative to the first end portion 15 (e.g., at the first end 26) of the pipe 20 (block 94). For example, the pipe 20 and/or the induction coil 22 may be moved to change the relative position between such components under control of control system 50 in pipe positioning system 18. Similarly, external quenching ring 24 and/or internal quenching ring 25 may be positioned relative to the pipe (block 96). For example, in one embodiment, the pipe 20 may be positioned relative to the quenching rings 24, 25 such that the pipe 20 first passes through the induction coil 22 and then passes through the quench ring 24. In some embodiments, the external quenching ring 24 and the internal quenching ring 25 may be aligned. For example, the external quenching ring 24 may be positioned to treat an outer surface of the heated annular band, and the internal quenching ring 24 may be positioned at the same location inside the central bore 45 to treat the corresponding inner surface of the heated annular band.

However, in other embodiments, there may be an offset distance between the external and the internal quenching rings 24 and 25. In some embodiments, the pipe bending system 10 may include only an external quenching ring 24. In other embodiments, the pipe bending system may include only an internal quenching ring 25. Additionally, one or both quenching rings may be used to treat the three portions 15, 17, 19 of the pipe 20. In some embodiments, the number of quenching rings may be different for each portion of the pipe 20. The distance between the quenching rings 24, 25, the air supply ring 37, and the induction coil 22 may be modified depending on the desired application.

When the induction coil 22 is in place, it may be activated to heat an annular band of the wall of pipe 20 (block 98). The heated band may then be quenched from one or both of the internal and external surfaces of the pipe 20 (block 100). For example, in one embodiment, after the pipe 20 passes through the induction coil 22, the internal and external quenching rings 24, 25 may release quenching fluid to quench the heated band of the pipe 20 from both the external and internal wall surfaces of the pipe 20, respectively. As external quenching ring 24 releases fluid, air supply ring 37 releases air toward the pipe, such that the air reduces or prevents the likelihood of cooling fluid getting into the induction heating zone.

In some embodiments, the quenching ring 24 and the quenching ring 25 may be controlled, e.g., by processor 42, to release a first quenching fluid from the quenching ring 24 and a second quenching fluid from the quenching ring 25 such that the first quenching fluid reaches the outer surface of the pipe 20 and the second quenching fluid reaches the inner surface of the pipe 20. In some embodiments, air supply ring 37 may also be controlled, e.g., by processor 42, such that air is in contact with the outer surface of the pipe while the quenching fluid from one or more of rings 24, 25 is in contact with the pipe.

For example, in one embodiment, the quenching ring 24 and the quenching ring 25 may be controlled, e.g., by processor 42, to release a first quenching fluid from the quenching ring 24 and a second quenching fluid from the quenching ring 25 such that the first quenching fluid reaches the outer surface of the pipe 20 and the second quenching fluid reaches the inner surface of the pipe 20 substantially concurrently. As used herein, "substantially concurrently" means at the same time, as defined by being within seconds. For example, in one embodiment, the first quenching fluid from quenching ring 24 may reach the outer surface of the pipe within 1 second of the second quenching fluid from quenching ring 25 reaching the inner surface of the pipe 20.

In certain embodiments, the foregoing feature may offer one or more advantages over systems in which the quenching fluid is directed from only a single surface (e.g., either the outer surface or the inner surface) and/or are directed with a time delay between the release of quenching fluid from the inner and outer quenching rings 25, 24. For example, if the first and second quenching fluid is directed at the inner and outer walls substantially concurrently, the temperature of the outer wall and the temperature of the inner wall may be approximately the same (e.g., within 1%) throughout the bending operation. By minimizing the temperature differential between the inner and outer surfaces of the pipe 20, greater homogeneity of metallurgical and/or mechanical properties may be obtained in the pipe bend 20'.

Greater homogeneity in the pipe bend 20' may be achieved by applying a uniform process to treat the pipe 20. For example, one or more sensors disposed on or near the quenching rings 24, 25 may monitor and/or control the temperature of the quenching fluid such that the quenching fluid released from the inner 25 and outer 24 quenching rings is the same temperature. In some embodiments, sensor 27 detects the temperature of the heated band of the pipe wall and controls both rings to release quenching fluid from supply 38 responsive to the sensor feedback. In other embodiments, the sensor 27 monitors the temperature of the heated pipe wall and controls one or both rings to release quenching fluid to maintain a uniform quenching temperature throughout the bending process.

The process of heating and quenching the pipe may be repeated until the first end portion 15 of the pipe 20 is fully treated (block 110). For example, in one embodiment, the pipe 20 may be moved with respect to the induction coil 22 in a continuous manner to create a heated band that moves along the length of the first end portion 15 of the pipe 20 throughout the operation. Along the length of the first end portion 15, the heating and quenching may be performed in the same manner as described for blocks 98 and 100 to reduce or eliminate the likelihood of transition zones in the pipe bend 20'.

To create the pipe bend, the induction coil 22, one or more of the quenching rings 24, 25, and air supply ring 37 are positioned at the beginning of the bend portion 17 (block 112). As noted above, since process 90 may be a continuous process, the positioning in block 112 may occur via the continuous movement of the pipe and one or more other system components. Further, in some embodiments, movement of a pivot arm (e.g., pivot arm 200) may be started in synchrony with heating and quenching of the pipe 20 to enable constant relative motion.

As before for the first end portion 15, the bend portion 17 of the pipe 20 may be heated and quenched while creating the bend in the pipe 20 (block 114). For example, the pipe 20 may passed through induction coil 22 and or more of quenching rings 24, 25 as the pipe 20 is bent, with the heating and quenching proceeding as described above for blocks 98 and 100 to reduce or eliminate the likelihood of transition zones in the pipe bend 20'. In one embodiment, the bend in pipe 20 may be created using a pivot arm attached to the front end 26 of the pipe 20, as described in detail below. In other embodiments, rollers or another bending implement may be used to generate the bend in the pipe 20.

After the bend portion 17 is treated, the induction coil 22 and one or more quenching rings 24, 25 are positioned at the beginning of the second end portion 19 of the pipe 20 (block 116). Here again, since process 90 may be continuous, movement of the induction coil may be initiated while one or more other steps are occurring. The second end portion 19 of the pipe 20 is then heated and quenched (block 118). The heating and quenching may be applied in a method similar to that described above for the first end portion 15 in blocks 98 and 100. One of ordinary skill in the art would recognize that the relative speed of the pipe 20 with respect to the induction coil 22 may be continuous throughout the process described in FIG. 2.

The process described in FIG. 2 may be fully automated or may be controlled, via a control interface, by an operator. In some embodiments, the process 90 is partially automated. In some embodiments, the pipe 20 may require further treatment after the process 90 to achieve certain material properties. It may be appreciated by one of skill in the art that the steps and system described in process 90 may be implemented to the pipe 20 in varying orders. For example, in one embodiment, the second end portion 19 may be treated first, followed by the bend portion 17, and then the first end portion 15.

An exemplary implementation of the process described with reference to FIG. 2 is illustrated by processes 120, 122, and 124, shown in FIGS. 3A-3C, respectively.

Figure 3A:
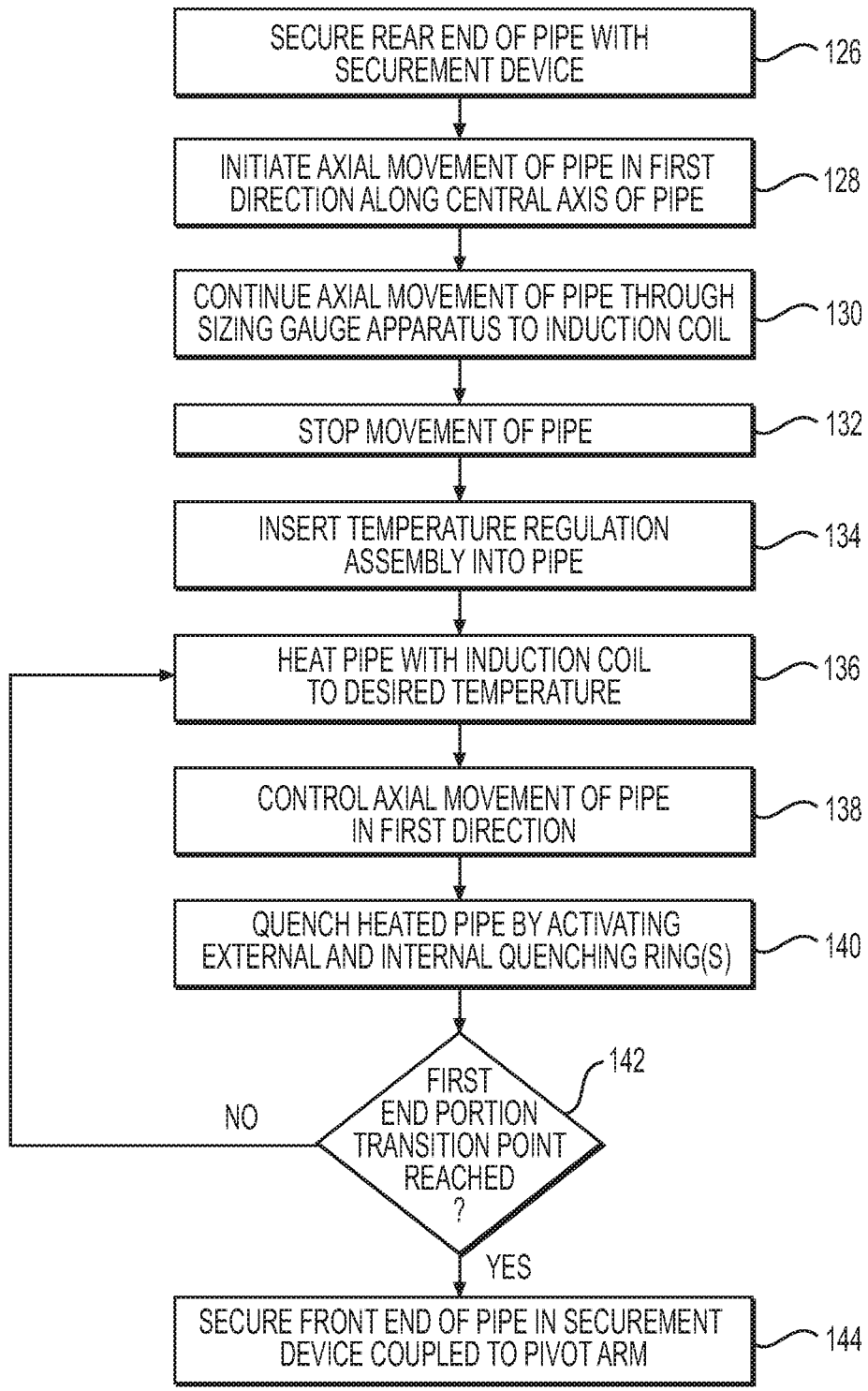
FIG. 3A is a flow chart of an exemplary process for treating a first end portion of a pipe, consistent with disclosed embodiments.
Figure 3B:
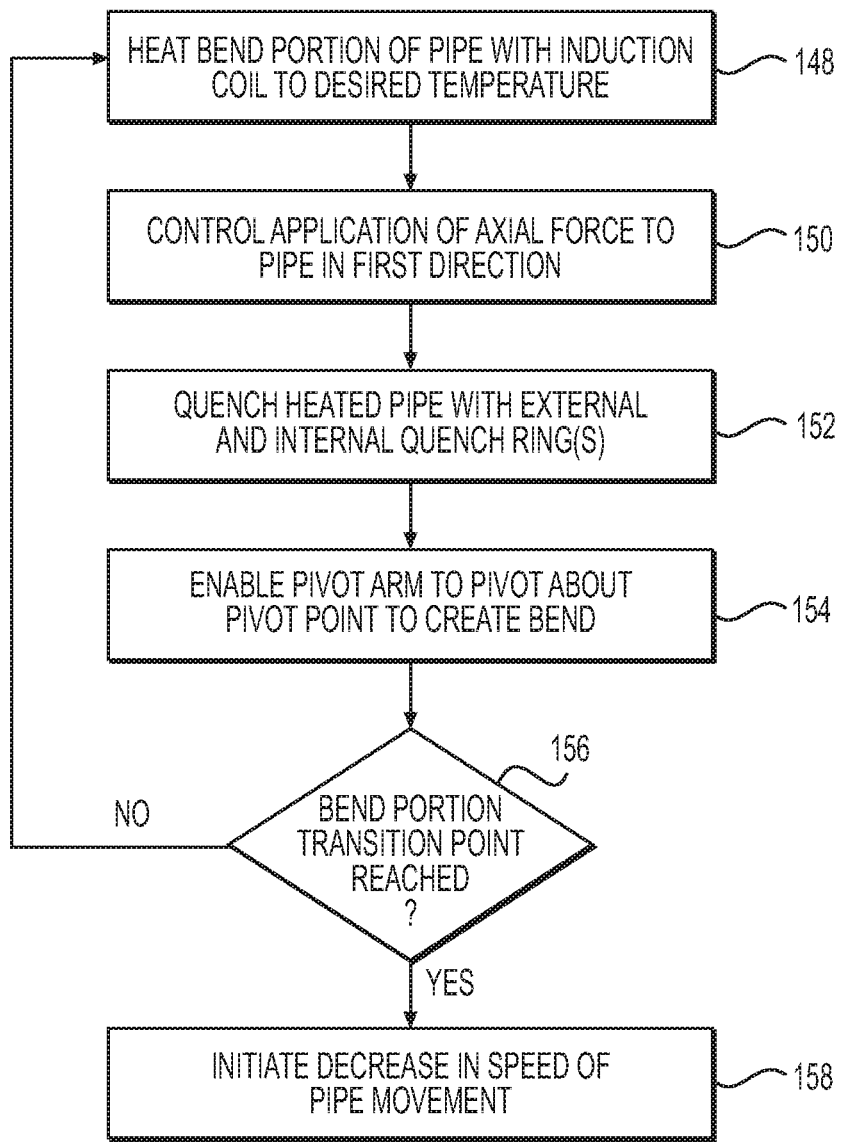
FIG. 3B is a flowchart of an exemplary process for manufacturing a pipe bend, consistent with disclosed embodiments.
Figure 4A:
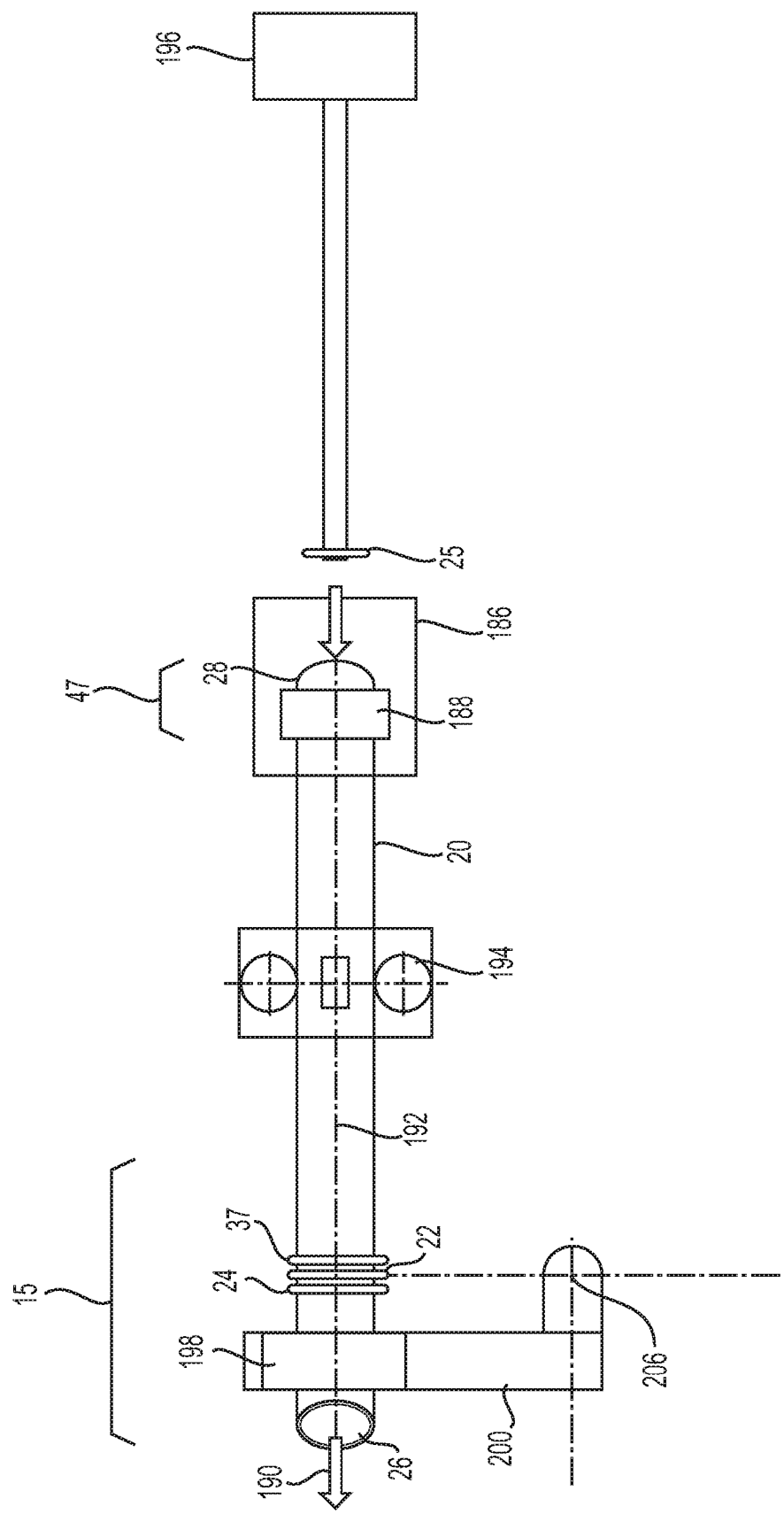
FIG. 4A is a schematic diagram of a system for treating a first end portion of a pipe, consistent with disclosed embodiments.

Referring to FIG. 3A, an exemplary process 120 for treating a first section 15 of a pipe 20 is shown, with reference also to FIG. 4A. A dummy portion 47 of the second, or rear, end 28 of a pipe 20 may be secured via a securement structure 186 by a securement device 188 (block 126). As previously described, the second end 28 of the pipe 20 may include the dummy length 47 of pipe, which is secured via securement structure 186. In one embodiment, the securement device 188 may be a clamp. In other embodiments, an alternative securement device or locking mechanism may be used. For example, the pipe may be secured using a vice or C-Clamp. Once the pipe 20 is secured, a drive mechanism, such as drive mechanism 48, or pushing device, coupled to the securement structure 186 begins to move the pipe 20 in a first direction indicated by the arrow 190 along a central axis 192 of the pipe 20 (block 128). In one embodiment, the drive mechanism 48 may be controlled by input from an operator or by the pipe positioning system 18 described previously. The pipe 20 may be driven through a sizing gauge 194 and then to the induction coil 22 (block 130). The sizing gauge 194 may maintain continuous loading on the pipe 20 through the bending process. In some embodiments, the sizing gauge 194 may be used to control the pipe diameter, straightness, and/or out of roundness (OOR). The size of sizing gauge 194 may be modified for various pipe specifications.

In the illustrated embodiment, once the front end 26 of the pipe 20 reaches the induction coil 22, the axial movement of the pipe 20 is stopped (block 132). In some embodiments, the pipe may be stopped once the dummy portion 49 of the front end 26 is passed through the induction coil 22. Once stopped, a temperature regulation assembly including the internal quenching ring 25 and the one or more sensors 27 is inserted into the pipe 20 until the internal quenching ring 25 is aligned with the external quenching ring 24 (block 134). The internal quenching ring 25 may be supported by a boom. Additionally, the boom may house one or more conduits for supplying power and/or quenching fluid to the quenching rings 24, 25 and/or air supply ring 37. In some embodiments, the temperature regulation assembly includes one or more temperature sensors 27 and/or processors. When the quenching rings 24, 25 are aligned, the induction coil 22 heats an annular band in the wall of pipe 20 (block 136). As the heated wall of pipe 20 reaches a desired temperature, the securement structure 186, driven by the drive mechanism 48, drives the pipe 20 forward in the direction of the arrow 190 at a constant speed (block 138). As previously described, the drive speed may be controlled by an operator and/or the pipe positioning system 18. The desired temperature of the induction coil 22 may be determined by the pipe material, the pipe wall thickness, and/or the desired bend radius and/or bend angle.

The quenching rings 24, 25 are activated to release quenching fluid to the inner and outer surfaces of the pipe 20, thereby cooling the heated annular band of the pipe 20 (block 140). In some embodiments, the internal and external quenching rings may supply quenching fluid of the same temperature when released from the quenching rings. During process 120, the temperature of the pipe 20 may be monitored by one or more sensors 27 and/or processors mounted on the temperature control apparatus 196. In response to the detected temperature of the pipe 20, the internal 25 and external 24 quenching rings may be actuated or stopped either individually or simultaneously. A processor or microprocessor may monitor the temperature of the interior and/or exterior pipe wall and dynamically control the activation of the quenching rings 24, 25 to maintain a preconfigured pipe temperature. In some embodiments, the temperature measurement and control system 16 uses a closed-loop feedback system to control the actuation of the internal and external quenching rings 24, 25. The desired quenching fluid temperature may be determined based on the pipe material, the pipe wall thickness, and/or the desired bend radius.

Pipe positioning system 18 may monitor the distance the pipe 20 has travelled and blocks 136, 138, and 140 are repeated until the induction coil 22 reaches the end of the first tangent portion 15 of the pipe 20 (block 142). When the entire tangent portion 15 of the pipe 20 has undergone heating and quenching, the front end 26 of the pipe 20 is secured by a securement device 198 to a pivot arm 200. In some embodiments, the dummy portion 49 of the front end 26 of the pipe 20 may be secured by securement device 198. As previously described, the dummy length 49 of pipe 21 may be removed post-treatment. In some embodiments, the length of the pivot arm 200 determines the bend radius 202, shown in FIG. 4B, of the pipe bend 17.

Figure 4B:
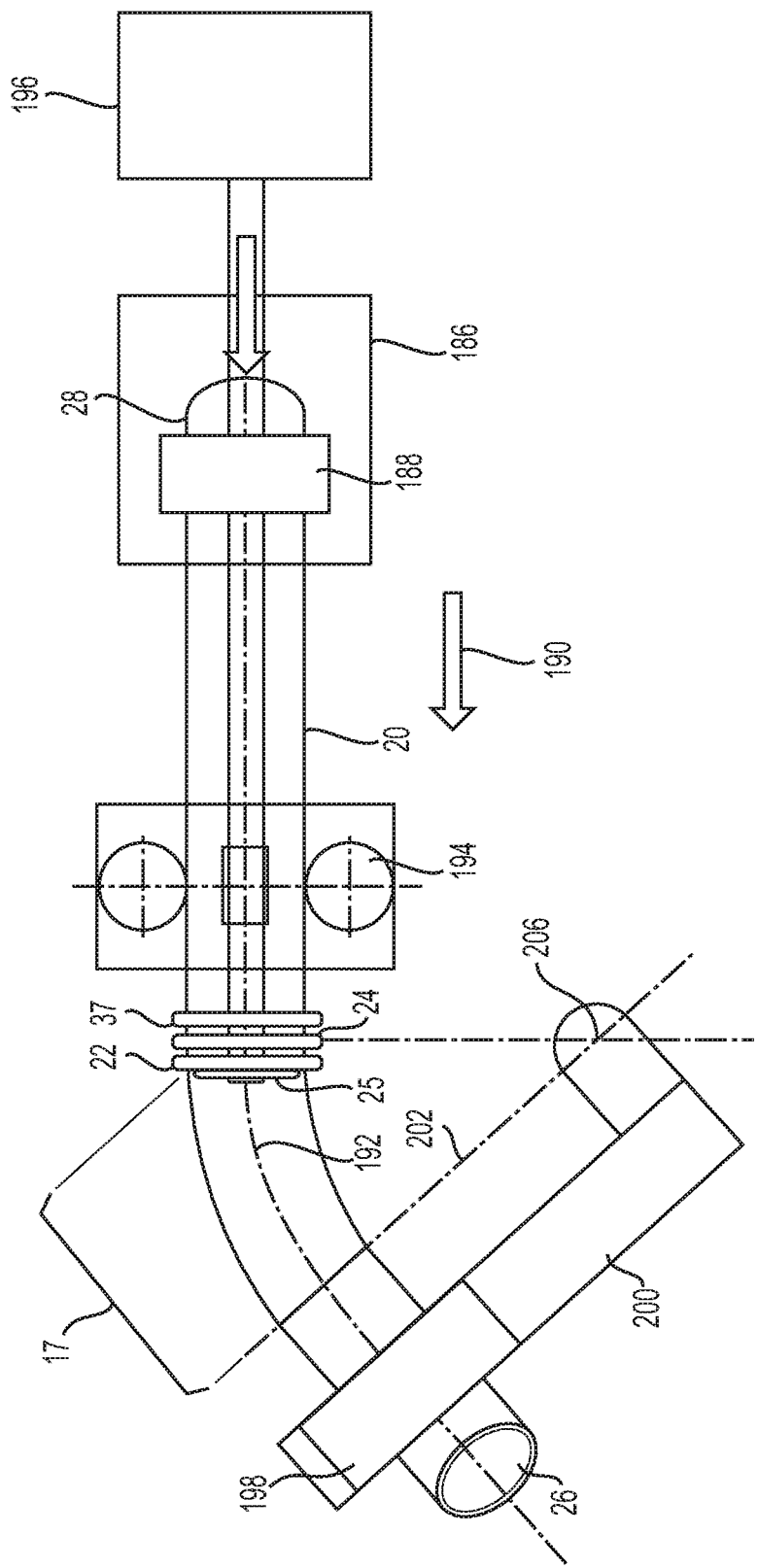
FIG. 4B is a schematic diagram of a system for generating a pipe bend, consistent with disclosed embodiments.

Referring now to process 122, shown in FIG. 3B, and the schematic shown in FIG. 4B, once the tangent portion 15 of the pipe 20 is treated as described with reference to FIG. 3A, the process to generate the bend portion 17 begins (block 148). As previously described with reference to process 120, the drive mechanism 48 applies an axial force to drive the pipe 20 in the first direction of the arrow 190 (block 150). In some embodiments, the applied drive mechanism speed may differ between the tangent 15, 19 and the bent 17 portions of the pipe 20. As described above, after the pipe 20 is heated by and passes through the induction coil 22, the pipe 20 is quenched by the internal and external quenching rings 24, 25 (block 152). In some embodiments, the spray angle of the quenching rings 24, 25 may be modified to quench the bend portion 17 of the pipe 20. In one embodiment, the induction coil temperature and/or the quenching fluid temperatures may be the same as used for treating the first end portion 15 and the second end portion 19 to achieve homogeneous properties along the entire circumferential lengths 41 and 43 of the pipe bend 20'. However, in other presently contemplated embodiments, the induction coil temperature and the internal and/or external quenching fluid temperatures may be different from those used to process the tangent portions 15, 19 of the pipe 20. For example, in one embodiment, one or more of the temperatures may differ in order to achieve the desired bend radius and reduce or prevent the likelihood that the bent portion will form different properties once bent.

As the drive mechanism 48 pushes the securement structure 186 and the pipe 20 forward along the central axis 192, the pivot arm 200, which may be able to move about a pivot point 206, applies force to the pipe 20 thereby causing the pipe 20 to bend (block 154). Blocks 148, 150, 152, and 154 are repeated until the end of the bend portion 17 is reached (block 156). In some embodiments, the bend length is defined by the transition points 28, 29 between the tangent portions 15, 19 and bent portion 17 of the pipe 20. Once the bend end point is reached, a controller, such as pipe positioning system 18, or an operator may initiate a decrease in the speed of the pipe movement (block 158). For example, drive mechanism 48 may gradually reduce the speed at which the pipe 20 is moving in the first direction 190.

Figure 3C:
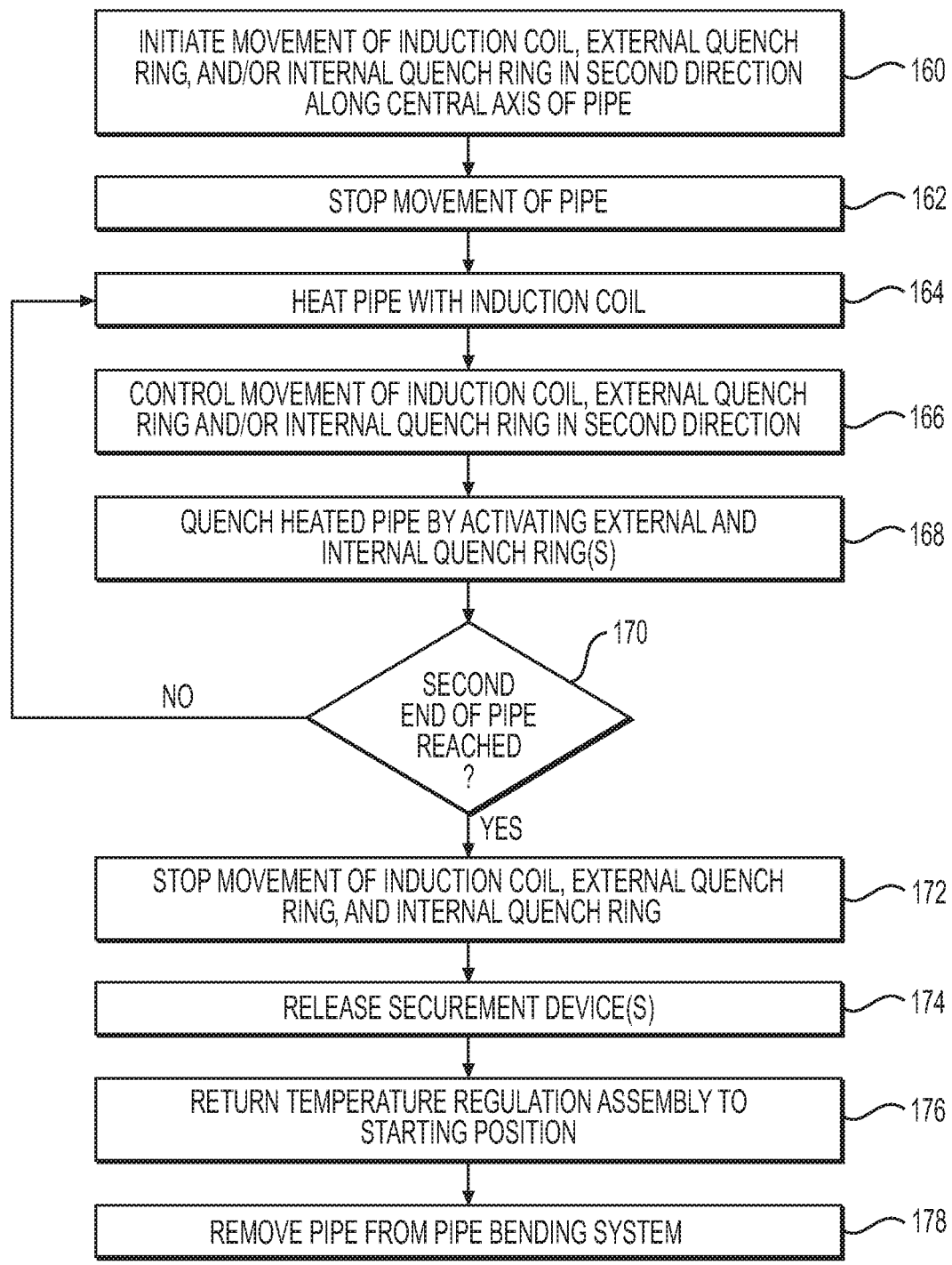
FIG. 3C is a flow chart of an exemplary process for treating a second end portion of a pipe, consistent with disclosed embodiments.
Figure 4C:
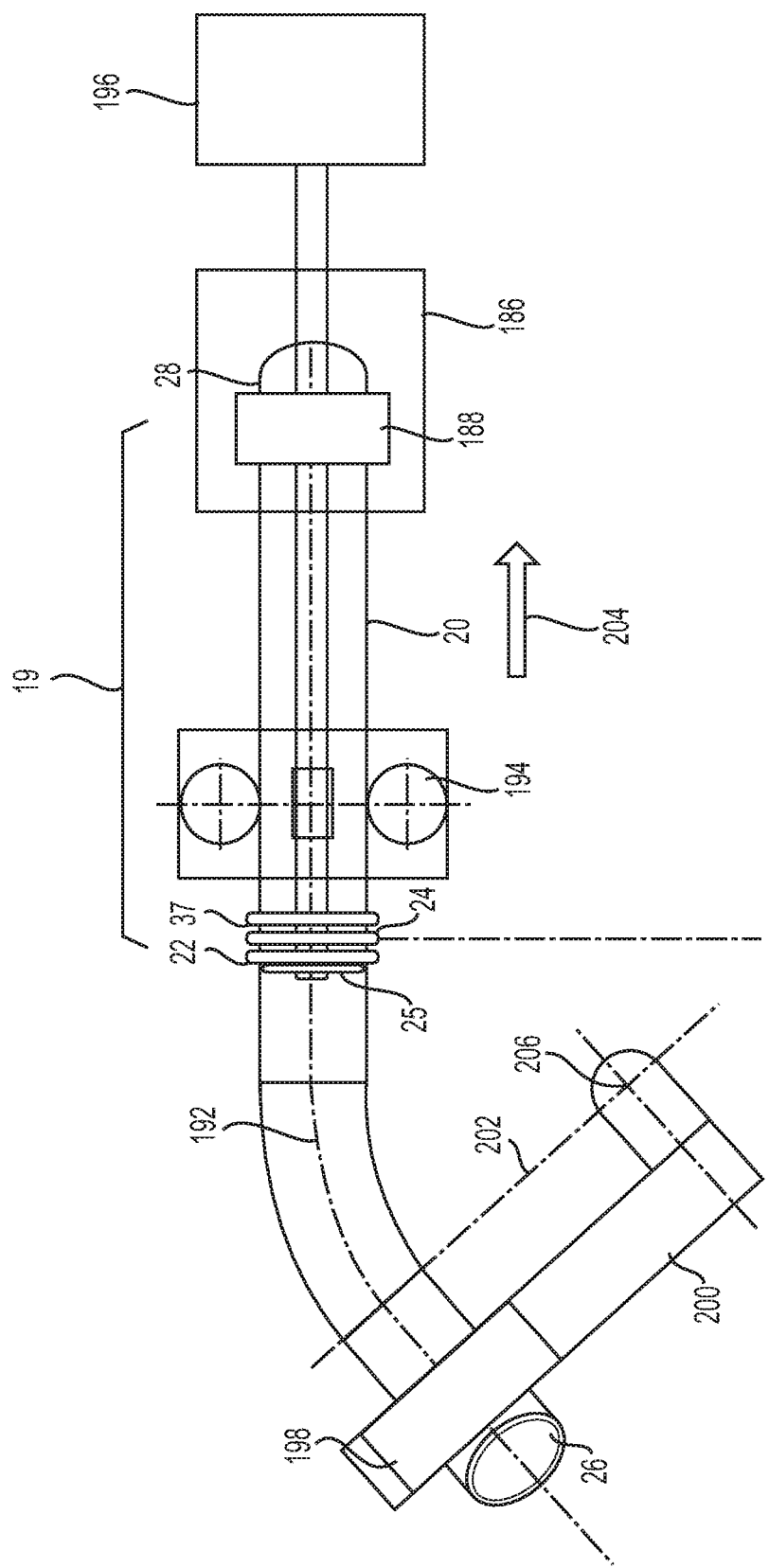
FIG. 4C is a schematic diagram of a system for treating a second end portion of a pipe, consistent with disclosed embodiments.

Referring now to process 124, shown in FIG. 3C, and the corresponding schematic shown in FIG. 4C, once the bend portion 17 is completed, a control system, such as temperature measurement and control system 16 and/or heating system 14, may initiate movement of the induction coil 22, the internal and external quenching rings 24, 25, and air supply ring 37 along the central axis 192 of the pipe 20 in the direction indicated by arrow 204 (block 160). In some embodiments, the pivot arm 200 may be secured by a securing structure to prevent movement of the treated pipe portions 15, 17 during treatment of the second tangent portion 19.

As the induction coil 22, the quenching rings 24, 25, and air supply ring 37 begin to move, the movement of the pipe 20 is stopped (block 162). In some embodiments, blocks 160 and 162 occur simultaneously. In some embodiments, the pipe 20 is not stopped completely, but is slowed to a predetermined speed to maintain a constant relative speed between the induction coil 22 and the pipe wall.

To achieve homogeneity along the pipe length, the relative speed between the pipe and the induction coil 22, quenching rings 24, 25, and air supply ring 37 may be constant throughout the pipe bending process. For example, while treating the tangent portion 19 of the pipe 20, the pipe may be slowed or may be stationary while the induction coil 22 may begin movement in a direction opposite that of the pipe 20. In this example, the rate of decrease of the pipe speed and the rate of increase of the induction coil 22 speed are controlled to maintain a substantially constant relative speed between the pipe 20 and the induction coil 22. As used herein, "substantially constant" may refer to the relative speed between the pipe 20 and the induction coil 22 being substantially uniform (i.e., ±0.5%) for the duration of the bending process. That is, the relative speed may vary slightly (e.g., by 0.1 mpm), and still be "substantially constant." In some embodiments, the speed of the internal 25 and external 24 quenching rings may be controlled in a manner similar to that described above with reference to induction coil 22. In some embodiments, the internal 25 and external 24 quenching rings are positioned such that the pipe 20 is passed through the induction coil 22 before quenching rings 24, 25.

The pipe 20 may be heated by the induction coil 22 (block 164). A control system, such as temperature measurement and control system 16 and/or heating system 14, may control the movement of the induction coil 22, the quenching rings 24, 25, and the air supply ring 37 in the second direction of arrow 204 (block 166). In some embodiments, the speed of the induction coil 22, the quenching rings 24,25, and air supply ring 37 is a constant, predetermined speed after the movement of the pipe 20 has stopped. In other embodiments, the speed of the induction coil 22, the quenching rings 24, 25, and air supply ring 37 may be controlled dynamically by a microprocessor or an operator monitoring the temperature of the pipe 20. The heated pipe may be quenched by the internal and external quenching rings 24, 25 (block 168). Blocks 164, 166, and 168 are repeated until the end 28 of the pipe 20 is reached or until the dummy portion 47 of the end 28 is reached (block 170) and the movement of the induction coil 22, the quenching rings 24, 25, and air supply ring 37 is stopped (block 172). Once the induction coil 22, the quenching rings 24, 25, and air ring 37 are stopped, the securement devices 188, 198 are released (block 174). Temperature regulation assembly 196 may be returned to its starting position, shown in FIG. 4A (block 176). With the temperature regulation assembly 196 removed, the pipe 20 may be removed from the pipe bending system 10 (block 178).

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as example only, with a true scope and spirit being indicated by the following claims and their full scope of equivalents.

What is claimed is:

1. A method for manufacturing a pipe bend, comprising:
heating, with an induction coil, a first annular band of a wall of a first end portion of a pipe while moving the pipe in a first direction at a first speed to establish a relative speed between the pipe and the induction coil;
directing quenching fluid toward an outer surface and an inner surface of the first annular band of the wall while moving the pipe in the first direction;
securing a first end of the pipe in a securement device coupled to a pivot arm;
heating a second annular band of a wall of a bend portion of the pipe while moving the pipe in the first direction;
directing the quenching fluid toward an outer surface and an inner surface of the second annular band in the wall while moving the pipe in the first direction;
decreasing the first speed of the pipe to stationary while moving the induction coil from stationary to a second speed in a second direction opposite the first direction, wherein a rate of decrease of the first speed and a rate of increase of the second speed are controlled to maintain a relative speed between the pipe and the induction coil substantially constant;
heating a third annular band of a wall of a second end portion of the pipe while moving the induction coil in the second direction;

directing the quenching fluid toward an outer surface and an inner surface of the third annular band of the wall while moving the induction coil in the second direction; and controlling a temperature sensor configured to measure a temperature of at least one of the heated annular bands;

wherein the temperature sensor and at least one quenching ring form a temperature regulation assembly, and wherein the temperature regulation assembly is coupled to a boom configured to house one or more conduits for providing power, or the quenching fluid, or both to the temperature regulation assembly.

2. The method of claim 1, wherein the quenching fluid is directed toward the outer surface and the inner surface of the first annular band at the same time.

3. The method of claim 1, wherein the quenching fluid contacts the outer surface of the first annular band while the quenching fluid contacts the inner surface of the first annular band.

4. The method of claim 1, further comprising directing air from an air supply toward the outer surface of the first annular band.

5. The method of claim 1, wherein the quenching fluid is directed toward the outer surface and the inner surface of the third annular band at substantially the same time.

6. The method of claim 1, wherein the quenching fluid is directed toward the inner and outer surfaces of the first annular band, the second annular band, and the third annular band at substantially the same temperature and in a single pass.

7. The method of claim 1, further comprising decreasing the first speed of the pipe to stationary while moving the at least one quenching ring from stationary to the second speed in the second direction.

8. The method of claim 1, wherein the at least one quenching ring comprises a first quenching ring configured to release the quenching fluid from a first location outside of the pipe and a second quenching ring configured to release the quenching fluid from a second location inside the pipe.

9. The method of claim 1, further comprising maintaining a predetermined load on the pipe throughout the method for manufacturing the pipe bend.

10. The method of claim 1, further comprising inserting one or more temperature sensors into the pipe.

11. The method of claim 10, further comprising controlling a position of the one or more temperature sensors to sequentially sense a temperature of the first annular band, a temperature of the second annular band, and a temperature of the third annular band.

12. A method for manufacturing a pipe bend, comprising:
heating, with an induction coil, a first annular band of a wall of a first end portion of a pipe while moving the pipe in a first direction at a first speed to establish a relative speed between the pipe and the induction coil;
directing quenching fluid toward an outer surface and an inner surface of the first annular band of the wall while moving the pipe in the first direction, wherein a first quenching fluid and a second quenching fluid are released such that the first quenching fluid contacts the outer surface while the second quenching fluid contacts the inner surface;
securing a first end of the pipe in a securement device coupled to a pivot arm;
heating a second annular band of a wall of a bend portion of the pipe while moving the pipe in the first direction;
directing the quenching fluids toward an outer surface and an inner surface of the second annular band of the wall while moving the pipe in the first direction;
decreasing the first speed of the pipe to stationary while moving the induction coil from stationary to a second speed in a second direction opposite the first direction, wherein a rate of decrease of the first speed and a rate of increase of the second speed are controlled to maintain a relative speed between the pipe and the induction coil substantially constant;
heating a third annular band of a wall of a second end portion of the pipe while moving the induction coil in the second direction; and
directing the quenching fluids toward an outer surface and an inner surface of the third annular band of the wall while moving the induction coil in the second direction; and
controlling a temperature sensor configured to measure a temperature of at least one of the heated annular bands;
wherein the temperature sensor and at least one quenching ring form a temperature regulation assembly, and wherein the temperature regulation assembly is coupled to a boom configured to house one or more conduits for providing power, or the quenching fluid, or both to the temperature regulation assembly.

13. The method of claim 12, further comprising controlling release of the first quenching fluid and the second quenching fluid at a point in time when the induction coil has stopped heating the first annular band of the wall of the first end portion of the pipe.

14. The method of claim 12, wherein the first quenching fluid and the second quenching fluid are at substantially the same temperature when released from a first quenching ring and a second quenching ring, respectively.

15. A method for manufacturing a pipe bend, comprising:
heating, with an induction coil, a first annular band of a wall of a first end portion of a pipe while moving the pipe in a first direction at a first speed to establish a relative speed between the pipe and the induction coil;
directing quenching fluid toward an outer surface and an inner surface of the first annular band of the wall while moving the pipe in the first direction;
securing a first end of the pipe in a securement device coupled to a pivot arm;
heating a second annular band of a wall of a bend portion of the pipe while moving the pipe in the first direction;
directing the quenching fluid toward an outer surface and an inner surface of the second annular band of the wall while moving the pipe in the first direction;
decreasing the first speed of the pipe to stationary while moving the induction coil from stationary to a second speed in a second direction opposite the first direction;
heating a third annular band of a wall of a second end portion of the pipe while moving the induction coil in the second direction; and
directing the quenching fluid toward an outer surface and an inner surface of the third annular band of the wall while moving the induction coil in the second direction; and
controlling at least one temperature sensor configured to measure a temperature of one of the heated annular bands;
wherein the temperature sensor and at least one quenching ring form a temperature regulation assembly, and wherein the temperature regulation assembly is coupled to a boom configured to house one or more conduits for providing power, or the quenching fluid, or both to the temperature regulation assembly.

16. The method of claim 15, wherein the quenching fluid is directed toward the outer surface and the inner surface of the first annular band at the same time.

17. The method of claim 15, wherein the quenching fluid contacts the outer surface of the first annular band while the quenching fluid contacts the inner surface of the first annular band.

18. The method of claim 15, wherein the quenching fluid is directed toward the inner and outer surfaces of the first annular band, the second annular band, and the third annular band at substantially the same temperature and in a single pass.

* * * * *